US012726779B2

(12) United States Patent
Laitinen et al.

(10) Patent No.: US 12,726,779 B2
(45) Date of Patent: Sep. 1, 2026

(54) APPARATUS, METHODS AND COMPUTER PROGRAMS FOR ENABLING RENDERING OF SPATIAL AUDIO

(71) Applicant: Nokia Technologies Oy, Espoo (FI)

(72) Inventors: Mikko-Ville Laitinen, Espoo (FI); Juha Tapio Vilkamo, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 63 days.

(21) Appl. No.: 18/723,930

(22) PCT Filed: Dec. 9, 2022

(86) PCT No.: PCT/FI2022/050821
§ 371 (c)(1),
(2) Date: Jun. 25, 2024

(87) PCT Pub. No.: WO2023/126573
PCT Pub. Date: Jul. 6, 2023

(65) Prior Publication Data
US 2025/0071497 A1 Feb. 27, 2025

(30) Foreign Application Priority Data
Dec. 29, 2021 (GB) ..................................... 2119070

(51) Int. Cl.
*H04S 7/00* (2006.01)
*H04S 3/02* (2006.01)

(52) U.S. Cl.
CPC ................ *H04S 7/302* (2013.01); *H04S 3/02* (2013.01); *H04S 7/307* (2013.01); *H04S 2400/01* (2013.01); *H04S 2400/11* (2013.01); *H04S 2420/07* (2013.01)

(58) Field of Classification Search
CPC . H04S 7/302; H04S 3/02; H04S 7/307; H04S 2400/01; H04S 2400/11; H04S 2420/07; H04S 7/30; G10L 19/173; G10L 19/008; G10L 19/16
USPC ..................................................... 381/22, 23
See application file for complete search history.

(56) References Cited

U.S. PATENT DOCUMENTS

| | | | | |
|---|---|---|---|---|
| 9,955,278 | B2 * | 4/2018 | Fersch | H04S 7/30 |
| 12,014,745 | B2 * | 6/2024 | Bruhn | G10L 19/008 |
| 2018/0233157 | A1 * | 8/2018 | Kim | G10L 19/008 |
| 2018/0288553 | A1 | 10/2018 | Lee et al. | |
| 2019/0103118 | A1 * | 4/2019 | Atti | G10L 19/008 |

(Continued)

FOREIGN PATENT DOCUMENTS

| | | | |
|---|---|---|---|
| EP | 3757992 | A1 | 12/2020 |
| GB | 2574238 | A | 12/2019 |

(Continued)

*Primary Examiner* — Xu Mei
(74) *Attorney, Agent, or Firm* — McCarter & English, LLP

(57) ABSTRACT

Examples of the disclosure enable spatial audio rendering in a different format to the format that is used for the spatial audio coding. In examples of the disclosure spatial audio and first spatial metadata in a first format are obtained. The first spatial metadata enables rendering of spatial audio in a first audio format. In order to enable rendering of the spatial audio in a different format the spatial metadata is converted to second spatial metadata corresponding to a second audio format. The spatial audio can then be rendered for the second format using the second spatial metadata.

20 Claims, 5 Drawing Sheets

(56) References Cited

U.S. PATENT DOCUMENTS

| | | | |
|---|---|---|---|
| 2020/0260206 | A1 | 8/2020 | Vilkamo et al. |
| 2021/0250717 | A1 | 8/2021 | Laitinen |
| 2021/0272574 | A1 * | 9/2021 | Bruhn ..................... H04S 3/008 |
| 2021/0337339 | A1 | 10/2021 | Vilkamo et al. |

FOREIGN PATENT DOCUMENTS

| | | | |
|---|---|---|---|
| GB | 2587357 | A | 3/2021 |
| GB | 2592388 | A | 9/2021 |
| JP | 2013517518 | A | 5/2013 |
| WO | 2011086060 | A1 | 7/2011 |
| WO | WO 2020/076708 | A1 | 4/2020 |
| WO | WO2021069794 | A1 | 9/2020 |

* cited by examiner

APPARATUS, METHODS AND COMPUTER PROGRAMS FOR ENABLING RENDERING OF SPATIAL AUDIO

CROSS REFERENCE TO RELATED APPLICATION

This patent application is a U.S. National Stage application of International Patent Application Number PCT/FI2022/050821 filed Dec. 9, 2022, which is hereby incorporated by reference in its entirety, and claims priority to GB 2119070.7 filed Dec. 29, 2021.

TECHNOLOGICAL FIELD

Examples of the disclosure relate to apparatus, methods and computer programs for enabling rendering of spatial audio. Some relate to apparatus, methods and computer programs for enabling rendering of spatial audio in different audio formats.

BACKGROUND

Spatial audio enables spatial properties of a sound scene to be reproduced for a user so that the user can perceive the spatial properties. This can provide an immersive audio experience for a user or could be used for other applications.

BRIEF SUMMARY

According to various, but not necessarily all, examples of the disclosure there is provided an apparatus comprising means for:

- obtaining an encoded spatial audio signal comprising one or more audio signals and first spatial metadata wherein the first spatial metadata is configured to enable rendering of spatial audio in a first audio format from the one or more audio signals;
- using, at least the first spatial metadata to determine second spatial metadata wherein the second spatial metadata enables rendering of spatial audio in a second audio format from the one or more audio signals; and
- enabling rendering of the spatial audio in the second audio format using at least the second spatial metadata and the one or more audio signals.

Using the first spatial metadata to determine the second spatial metadata may comprise determining rendering information from the first spatial metadata and calculating the second spatial metadata from the rendering information.

The rendering information may comprise one or more mixing matrices.

Using the first spatial metadata to determine the second spatial metadata may comprise calculating the second spatial metadata directly from the first spatial metadata.

Using the first spatial metadata to determine the second spatial metadata may be based on the one or more audio signals.

Using the first spatial metadata to determine the second spatial metadata may comprise determining one or more covariance matrices of the one or more audio signals The means may be for determining the second spatial metadata without rendering the spatial audio in the first audio format.

The means may be for enabling different types of spatial metadata to be used for rendering different frequencies of the spatial audio.

General spatial metadata may be used for rendering a first set of frequencies of the spatial audio and a format specific further spatial metadata may be used for a second set of frequencies.

The audio formats may comprise one or more of: Ambisonic formats, binaural formats multichannel loudspeaker formats.

The spatial metadata may comprise information that enables mixing of audio signals so as to enable rendering of the spatial audio in a selected audio format.

The spatial metadata may comprise, for one or more frequency sub-bands, information indicative of;

- a sound direction, and
- sound directionality.

The spatial metadata may comprise, for one or more frequency sub-bands one or more prediction coefficients.

The spatial metadata may comprise one or more coherence parameters.

According to various, but not necessarily all, examples of the disclosure there is provided an apparatus comprising at least one processor; and at least one memory including computer program code, the at least one memory and the computer program code configured to, with the at least one processor, cause the apparatus at least to perform:

- obtaining an encoded spatial audio signal comprising one or more audio signals and first spatial metadata wherein the first spatial metadata is configured to enable rendering of spatial audio in a first audio format from the one or more audio signals;
- using, at least the first spatial metadata to determine second spatial metadata wherein the second spatial metadata enables rendering of spatial audio in a second audio format from the one or more audio signals; and
- enabling rendering of the spatial audio in the second audio format using at least the second spatial metadata and the one or more audio signals.

According to various, but not necessarily all, examples of the disclosure there is provided an electronic device comprising an apparatus as described herein wherein the electronic device is at least one of: a telephone, a camera, a computing device, a teleconferencing apparatus.

According to various, but not necessarily all, examples of the disclosure there is provided a method comprising:

- obtaining an encoded spatial audio signal comprising one or more audio signals and first spatial metadata wherein the first spatial metadata is configured to enable rendering of spatial audio in a first audio format from the one or more audio signals;
- using, at least the first spatial metadata to determine second spatial metadata wherein the second spatial metadata enables rendering of spatial audio in a second audio format from the one or more audio signals; and
- enabling rendering of the spatial audio in the second audio format using at least the second spatial metadata and the one or more audio signals.

According to various, but not necessarily all, examples of the disclosure there is provided a computer program comprising computer program instructions that, when executed by processing circuitry, cause:

- obtaining an encoded spatial audio signal comprising one or more audio signals and first spatial metadata wherein the first spatial metadata is configured to enable rendering of spatial audio in a first audio format from the one or more audio signals;
- using, at least the first spatial metadata to determine second spatial metadata wherein the second spatial metadata enables rendering of spatial audio in a second audio format from the one or more audio signals; and enabling rendering of the spatial audio in the second audio format using at least the second spatial metadata and the one or more audio signals.

BRIEF DESCRIPTION

Some examples will now be described with reference to the accompanying drawings in which:

FIG. 1 shows an example system;
FIG. 2 shows an example method;
FIG. 3 shows an example decoder;
FIG. 4 shows an example spatial synthesizer;
FIG. 5 shows another example decoder;
FIG. 6 shows an example device; and
FIG. 7 shows an example apparatus.

DETAILED DESCRIPTION

Examples of the disclosure enable spatial audio rendering in a different format to the format that is used for the spatial audio coding. In examples of the disclosure spatial audio and first spatial metadata in a first format are obtained. The first spatial metadata enables rendering of spatial audio in a first audio format. In order to enable rendering of the spatial audio in a different format the spatial metadata is converted to second spatial metadata corresponding to a second audio format. The spatial audio can then be rendered for the second format using the second spatial metadata.

FIG. 1 shows an example system 101 that can be used to implement examples of the disclosure. The system comprises an encoder 105 and a decoder 109. The encoder 105 and the decoder 109 can be in different devices. In some examples the encoder 105 and the decoder 109 could be in the same device.

The system 101 is configured so that the encoder 105 obtains an input comprising audio signals 103. In this example the audio signals 103 could be first order Ambisonic (FOA) signals. Other types of audio signals 103 could be used in other examples of the disclosure.

The audio signals 103 can be obtained from two or more microphones configured to capture spatial audio. In examples where the audio signals 103 comprise FOA audio signals the FOA audio signals could be obtained from a dedicated Ambisonics microphones such as an Eigenmike or any other suitable means.

The encoder 105 can comprise any means that can be configured to encode the audio signals 103 to provide a bitstream 107 as an output. The encoder 105 can be configured to use parametric methods to encode the audio signals 103. The parametric methods could comprise Immersive Voice and Audio Services (IVAS) methods or any other suitable type of methods. The encoder 105 can be configured to use the audio signals 103 to determine transport audio signals and spatial metadata. The transport audio signals and spatial metadata can then be multiplexed to provide the bitstream 107.

In some examples the bitstream 107 can be transmitted from a device comprising the encoder 105 to a device comprising the encoder 109. In some examples the bitstream 107 can be stored in the device comprising the encoder 105 and can be retrieved and decoded by a decoder 109 when appropriate.

The decoder 109 is configured to receive the bitstream 107 as an input. The decoder 109 comprises means that can be configured to decode the bitstream 107. The decoder 109 can decode the bitstream to the transport audio and the spatial metadata. The decoder 109 can be configured to render the spatial audio output 111 using the decoded spatial metadata.

If the system 101 is to be used to provide the spatial audio output 111 in the same format used for the spatial audio signals 103 then the decoder 109 can use the spatial metadata provided in the bitstream 107 to render the spatial audio output 111.

In examples of the disclosure the system 101 can be configured to provide the spatial audio output 111 in a different format to the format that is used for the spatial audio signals 103. In such examples the decoder 109 can be configured to obtain a different set of spatial metadata from the spatial metadata provided in the bitstream 107. This different set of spatial metadata can enable the spatial audio output 111 to be rendered in the different format. For instance, in the example of FIG. 1 the system can obtain FOA audio signals. The decoder 109 can be configured to convert the spatial metadata in the bitstream 107 from FOA-related spatial metadata to binaural-related spatial metadata or any other suitable type of spatial metadata.

FIG. 2 shows an example method that can be used to enable rendering of spatial audio in different audio formats. The method could be implemented in a system 101 such as the system 101 shown in FIG. 1.

Figure 1:
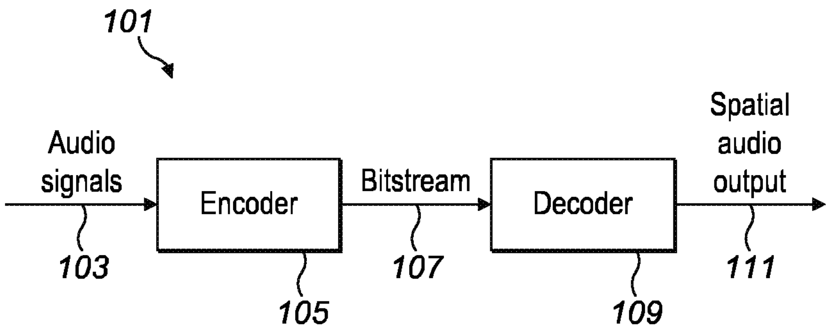

The method comprises, at block 201, obtaining an encoded spatial audio signal. The encoded spatial audio signals comprise one or more audio signals and also first spatial metadata. The first spatial metadata is configured to enable rendering of spatial audio in a first audio format from the one or more audio signals. The first spatial metadata comprises format specific spatial metadata.

The first spatial metadata can comprise, for one or more frequency sub-bands, information indicative of one or more parameters specific to the first audio format. For example, if the first audio format is FOA signals the first spatial metadata can comprise, for one or more frequency sub-bands, information indicative of how to predict FOA signals from the transport audio signal. Such information could comprise prediction coefficients for predicting FOA signals from the transport audio signals. For example, the omnidirectional signal W of FOA can be used as the transport audio signal, and the prediction coefficients can be used to predict dipole signals X, Y, and Z from the transmitted signal W.

The first spatial metadata can be obtained with a corresponding audio signal. For instance, in the system 101 of FIG. 1 the decoder 109 can obtain the bitstream 107 which comprises both the one or more audio signals and the corresponding first spatial metadata. References to audio signals or transport audio signals can be references to one or more audio signals or one or more transport audio signals.

At block 203 the method comprises using the first spatial metadata to determine second spatial metadata. The second spatial metadata is different to the first spatial metadata. The second spatial metadata enables rendering of the spatial audio in a second audio format from the one or more audio signals.

The second audio format can be different to the first audio format. For example, if the first audio format is FOA audio then the second audio format could be a binaural format or any other suitable format.

In some examples, using the first spatial metadata to determine the second spatial metadata comprises determining rendering information from the first spatial metadata. The second spatial metadata can then be calculated from the rendering information. The rendering information could comprise any information that indicates how the audio signals 103 associated with the first spatial metadata should be mixed and/or decorrelated in order to produce an audio output in the first format. The rendering information could comprise one or more mixing matrices.

In some examples using the first spatial metadata to determine the second spatial metadata can comprises calculating the second spatial metadata directly from the first spatial metadata. In such examples the second spatial metadata can be calculated without determining any intermediate rendering information.

In some examples different types of spatial metadata can be used for rendering different frequencies of the spatial audio. For instance, general spatial metadata could be used for rendering a first set of frequencies of the spatial audio and a format specific further spatial metadata could be used for a second set of frequencies. The first set of frequencies could be higher frequencies and the second set of frequencies could be lower frequencies.

The general spatial metadata could comprise spatial metadata that can enable rendering to any output format or to a plurality of different output formats. The general spatial metadata could comprise, for one or more frequency subbands, information indicative of a sound direction and information indicative of sound directionality. The sound directionality can be an indication of how directional or non-directional the sound is. The sound directionality can provide an indication of whether the sound is ambient sound or provided from point sources. The sound directionality can be provided as energy ratios of direct to ambient sound or in any other suitable format. In some examples the spatial metadata comprises one or more coherence parameters, or any other suitable parameters.

At block 205 the method comprises enabling rending of the spatial audio using the second spatial metadata and the one or more audio signals.

The example methods therefore enable the second spatial metadata to be determined without first rendering the spatial audio to the first format. This can provide for improved quality in the spatial audio output 111.

Figure 2:
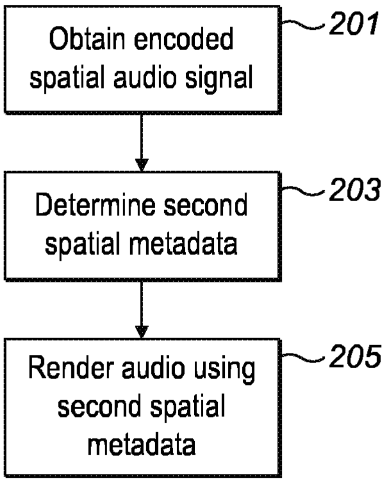
FIGS. 2 to 5 show example methods and parts of the system 101 that can be used to enable the different set of spatial metadata to be obtained.
Figure 3:
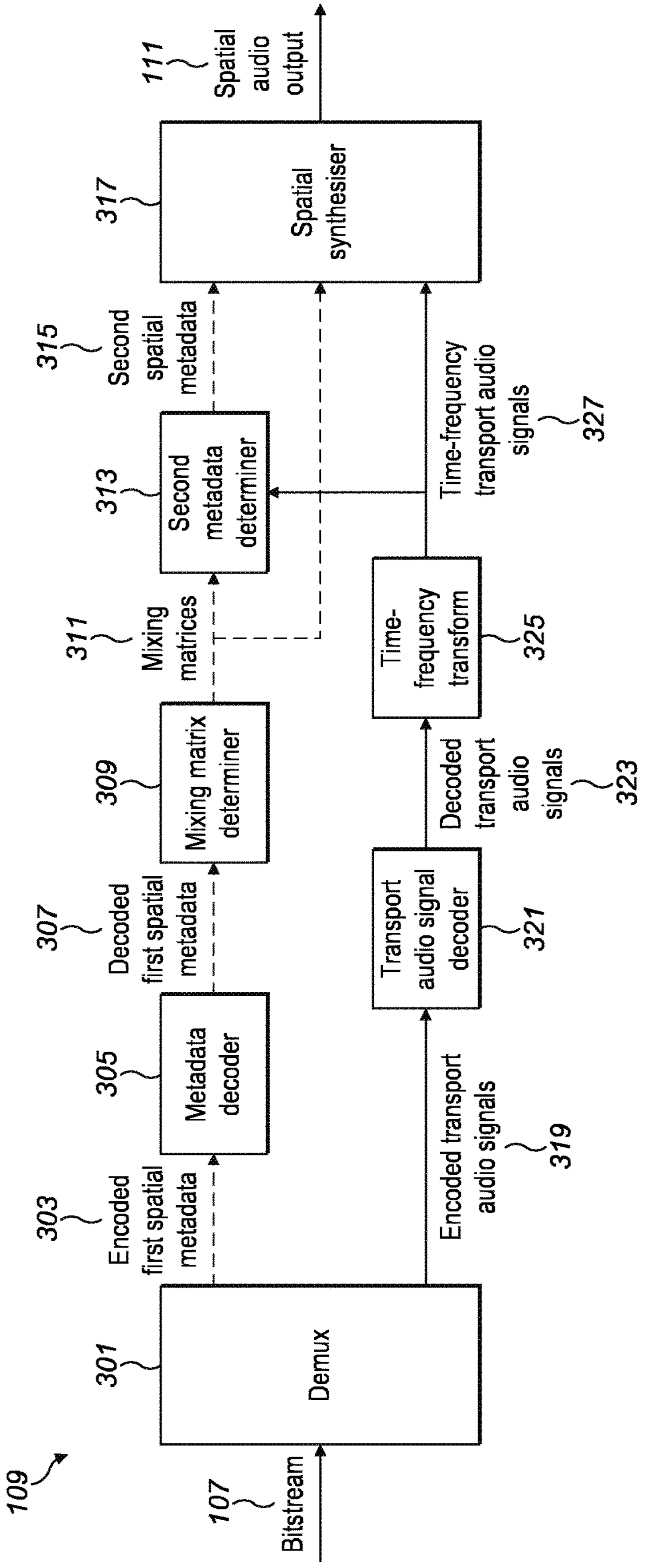

FIG. 3 schematically shows an example decoder 109. The example decoder 109 can be provided within a system 101 such as the system of FIG. 1. The example decoder 109 can be configured to implement methods such as the methods of FIG. 2 so as to enable spatial audio to be rendered in a different format to the format in which it was obtained.

The decoder 109 receives the bitstream 107 as an input. The bitstream 107 can comprise first spatial metadata and corresponding audio signals. The bitstream 107 is provided to a demultiplexer 301. The demultiplexer 301 is configured to demultiplex the bitstream 107 into a plurality of streams. In the example of FIG. 3 the demultiplexer 301 demultiplexes the bitstream 107 into a first stream and a second stream. The first stream comprises the encoded first spatial metadata 303 and the second stream comprises the encoded transport audio signals 319.

The encoded transport audio signals 319 are provided to a transport audio signal decoder 321. The transport audio signal decoder 321 is configured to decode the encoded transport audio signals 319 to provide decoded transport audio signals 323 as an output. The processes that are used to decode the encoded transport audio signals 319 can comprise corresponding processes that were used by the encoder 105 to encode the audio signals. The transport audio signal decoder 321 could comprise an Enhanced Voice Services (EVS) decoder, an Advanced Audio Coding (AAC) decoder or any other suitable type of decoder.

The decoded transport audio signals 323 are provided to a time-frequency transform block 325. The time-frequency transform block 325 is configured to change the domain of the decoded transport audio signals 323. In some examples the time-frequency transform block 325 is configured to convert the decoded transport audio signals 323 into a time-frequency representation. The time-frequency transform block 325 can be configured to use any suitable means to change the domain of the decoded transport audio signals 323. For instance, the time-frequency transform block 325 can be configured to use a short-time Fourier transform (STFT), a complex-modulated quadrature mirror filter (QMF) bank, a low-delay variant thereof or any other suitable means.

The time-frequency transform block 325 provides time-frequency transport audio signals 327 as an output.

The encoded first spatial metadata 303 is provided as an input to a metadata decoder 305. The metadata decoder 305 is configured to decode the encoded first spatial metadata 303 to provide decoded first spatial metadata 307 as an output. The processes that are used to decode the encoded first spatial metadata 303 can comprise corresponding processes that were used by the encoder 105 to encode the first spatial metadata. The metadata decoder 305 could comprise any suitable type of decoder.

The format of the decoded first spatial metadata 307 is dependent upon the first spatial audio format that was used to encode the audio signals. For example, if the audio signals have been encoded for FOA rendering then the decoded first spatial metadata 307 will be in a format that enables FOA rendering. If the audio signals have been encoded for binaural rendering the decoded first spatial metadata 307 will be in a format that enables binaural rendering. Different types of audio formats could be used in other examples.

In examples where the first spatial audio format is FOA audio then the decoded first spatial metadata 307 can comprise FOA prediction coefficients or any other suitable type of data. The FOA prediction coefficients comprise information that can be converted to rendering information such as mixing matrices. The rendering information or mixing matrices can comprise any information that indicates how the audio signals should be mixed and/or decorrelated in order to produce an audio output in the first format.

The decoded first spatial metadata 307 is provided as an input to a mixing matrix determiner block 309. The mixing matrix determiner block 309 can be configured to determine one or more mixing matrices and/or any other suitable rendering information. The mixing matrix determiner block 309 provides mixing matrices 311 as an output.

The mixing matrices can be determined based on the decoded first spatial metadata 307. The mixing matrices can be written as $A(i,j,k,n)$ where i is the output channel index, j the input channel, k the frequency band, and n the temporal frame. The mixing matrices can be used to render FOA signals by applying them to the transport audio signals, and/or decorrelated versions of the transport audio signals.

Other types of rendering information could be obtained in other examples. In some examples the rendering information need not be obtained. For instance, the second spatial metadata could be obtained directly from the first spatial metadata. In some examples the decoded first spatial metadata 307 could already be the mixing matrices or other rendering information and so, in such examples, it is not necessary to use a mixing matrix determiner block 309.

In examples where the audio does not need to be converted to a second audio format the mixing matrices, or other rendering information, can be used to render the decoded time-frequency transport audio signals 327. As an example, the decoded time-frequency transport audio signals 327 can be denoted as a column vector s(b, n), where b is a frequency bin index and the rows of the vector represent the transport audio signal channel. The number of rows could be between one and four depending on the applied bit rate and any other suitable factors. If the number of channels is less than four then the number of rows in the vector s(b, n) will also be less than four. In such examples the column vector can be appended with new channels to form a vector s'(b, n) with four rows. The new channels can be decorrelated versions of the first channel signal of s(b, n).

The FOA signals are then rendered by $$y(b, n) = A(k, n)s'(b, n)$$

where k is the frequency band where bin frequency bin b resides. The spatial metadata for a frequency band can correspond to one or more frequency bins of the filter bank that has been used for transforming the audio signals.

In the above equation the mixing matrix A can be written as:

$$A(k, n) = \begin{bmatrix} A(1, 1, k, n) & \dots & A(1, 4, k, n) \\ \vdots & \ddots & \vdots \\ A(4, 1, k, n) & \dots & A(4, 4, k, n) \end{bmatrix}$$

This notation implies that the temporal resolution of the signals s(b,n) and of the mixing matrices A(k,n) (that is, the metadata temporal resolution) is the same. This could be the case for systems 101 that use filter banks such as the STFT which are configured to apply a coarse temporal resolution. A coarse temporal resolution could use temporal steps of around 20 milliseconds for the filterbank. Other filterbanks could have a finer temporal resolution. In such cases the spatial metadata resolution would be sparser than the resolution of the audio signals. In these examples the same mixing matrix could be applied to a plurality of different time indices of the audio signal or the mixing matrices could be temporally interpolated.

In examples where the audio is to be converted to a second audio format then the mixing matrices, or other rendering information, can be used to determine the second spatial metadata instead of being used to render the spatial audio.

In these cases the mixing matrices A(i,j,k,n) 311 are provided as an input to a second metadata determiner 313 as shown in FIG. 3. The second metadata determiner 313 also receives the time-frequency transport audio signals 327 as an input.

The second metadata determiner 313 is configured to determine the second spatial metadata that enables rendering of the audio signals in the second audio format. The second metadata determiner 313 can be configured to use the mixing matrices 311 and the time-frequency transport audio signals 327 to determine the second spatial metadata 315.

In this example the second audio format is a binaural format. Other formats could be used in other examples of the disclosure. For example, the second audio format could be multichannel loudspeaker formats or higher order Ambisonic (HOA) formats or any other suitable format. The second audio format could be any format other than the original format for which the first spatial metadata is intended.

In this example the second spatial metadata 315 comprises direction (azimuth, elevation) θ(k,n),ϕp(k,n) parameters and direct-to-total energy ratio r(k,n) parameters. The parameters are provided in frequency bands. Other types of parameters could be used in other examples of the disclosure.

In order to determine the second spatial metadata 315 the second metadata determiner 313 can first determine the covariance matrix of the signal s'(b,n) which is the time-frequency transport audio signal 327 appended with the decorrelated versions of the first channel so that the time-frequency transport audio signal 327 comprises four channels. The covariance matrix can be formulated as:

$$C_{s'}(k, n) = \sum_{b=b_{low}(k)}^{b_{high}(k)} s'(b, n)(s'(b, n))^H$$

where the superscript H denotes a conjugate transpose and $b_{low}(k)$ and $b_{high}(k)$ are the first and the last bins of band k.

For the purposes of parameter estimations only the covariance matrix is needed and not the actual signals. In a practical implementation it can be more efficient to formulate the covariance matrix of s(b, n) by $$C_s(k, n) = \sum_{b=b_{low}(k)}^{b_{high}(k)} s(b, n)(s(b, n))^H$$

If the size of the covariance matrix obtained using this method is less than 4×4, then the matrix can be zero-padded to bring it to a 4×4 size. The energy values corresponding to the first channel can then be placed to the zero-padded diagonal entries within the matrix. This operation assumes that the decorrelated signals are generated from the first channel and that they are incoherent with respect to the first channel and with respect to each other. The result is therefore an estimate of $C_{s'}(k, n)$ without actually forming the decorrelated channels.

In some embodiments the estimation of $C_{s'}(k,n)$ can also have temporal averaging over the time axis. The temporal averaging could be implemented using infinite impulse repose (IIR), finite impulse response (FIR) averaging or any other suitable type of temporal averaging.

Then, a FOA covariance matrix is formulated by $$C_{FOA}(k, n) = A(k, n)C_{s'}(k, n)A^H(k, n)$$

Then, when denoting $c_{i,j}(k,n)$ as the real part of the i:th row and j:th column of $C_{FOA}(k,n)$, the direction parameter can be formulated by $$\theta(k, n) = a\tan2(c_{1,2}(k, n), c_{1,4}(k, n))$$

$$\phi(k, n) = a\tan2\left(c_{1,3}(k, n), \sqrt{(c_{1,4}(k, n))^2 + (c_{1,2}(k, n))^2}\right)$$

where the typical Ambisonic channel ordering WYZX is assumed. a tan 2 is a computational variant of arctan that takes the correct quadrant into account. An energy ratio parameter can be formulated by $$r(k, n) = \frac{2\sqrt{(c_{1,2}(k, n))^2 + (c_{1,3}(k, n))^2 + (c_{1,4}(k, n))^2}}{tr(C_{FOA}(k, n))}$$

where the operation tr( ) is the matrix trace.

The second spatial metadata 315 which is provided as an output of the second metadata determiner 313 then comprises direction (azimuth, elevation) θ(k, n), ϕ(k, n) and direct-to-total energy ratio r(k, n).

The second spatial metadata 315 and the time-frequency transport audio signals 327 and the mixing matrices 311 are provided as inputs to the spatial synthesizer 317. The spatial synthesizer 317 is configured to use the second spatial metadata 315, the time-frequency transport audio signals 327 and the mixing matrices 311 to render the spatial audio output 111. The spatial audio output can be a binaural output or any other suitable audio format.

Figure 4:
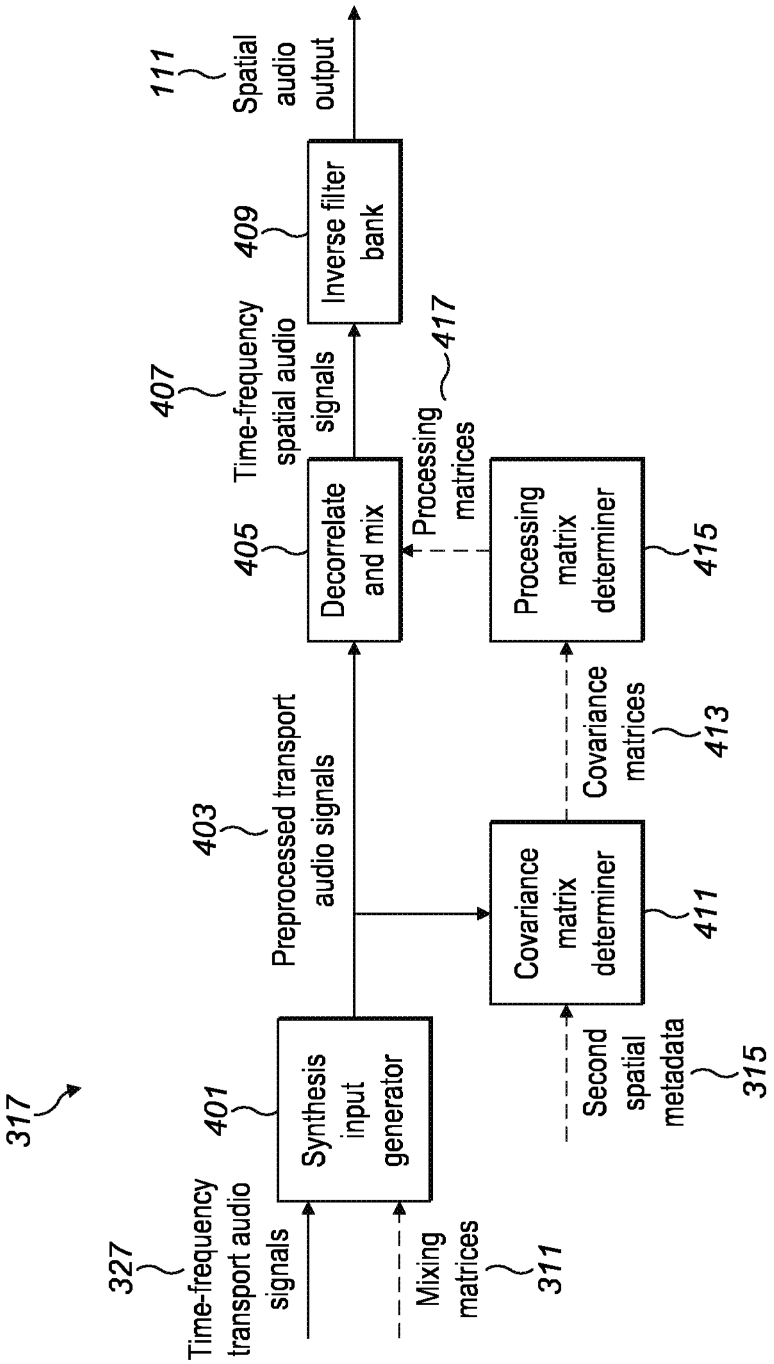

FIG. 4 schematically shows an example spatial synthesizer 317. The example spatial synthesizer 317 can be provided within a decoder 109 such as the decoder 109 shown in FIG. 3. In this example the second spatial metadata 315 comprises direct-to-total energy ratios and directions. In other examples the second spatial metadata 315 could comprise other parameters such as spread and surrounding coherences.

The spatial synthesizer 317 receives the second spatial metadata 315, the time-frequency transport audio signals 327 and the mixing matrices 311 as inputs.

As shown in FIG. 4 the time-frequency transport audio signals 327 and the mixing matrices 311 are provided as inputs to a synthesis input generator 401. The synthesis input generator 401 is configured to convert the time-frequency transport audio signals 327 to a suitable format for processing by the rest of the blocks within the spatial synthesizer 317.

The processes that are performed by the synthesis input generator 401 may be dependent upon the number of transport channels that are used. In examples where the time-frequency transport audio signals 327 comprise a single channel (mono transport) the synthesis input generator 401 can allow the time-frequency transport audio signals 327 to pass through without performing any processing on the time-frequency transport audio signals 327. In some examples the single channel signals could be duplicated to create a signal comprising two or more channels. This can provide a dual-mono or pseudo stereo signal.

In examples where the time-frequency transport audio signals 327 comprise a plurality of channels the synthesis input generator 401 can be configured to generate a stereo track. The stereo track can represent cardioid patterns towards different directions, such as the left direction and the right direction.

The cardioid patterns can be obtained by using any suitable process. For example, they can be obtained by applying a matrix A'(k, n) to the time-frequency transport audio signals 327. The matrix A'(k, n) comprises the first two rows of matrix A(k, n). This therefore provides W and Y spherical harmonic signals.

After the matrix A'(k, n) has been applied a left-right cardioid beamforming matrix can be applied to provide the pre-processed transport audio signals 403.

The pre-processed transport audio signals x(b, n) 403 can be written as:

$$x(b, n) = \frac{1}{2}\begin{bmatrix} 1 & 1 \\ 1 & -1 \end{bmatrix} A'(k, n)s(b, n)$$

where band k is the band where bin b resides.

The pre-processed transport audio signals x(b, n) 403 are provided as an output of the synthesis input generator 401.

The pre-processed transport audio signals 403 and the second spatial metadata 315 are provided as an input to a covariance matrix determiner 411. The covariance matrix determiner 411 is configured to determine an input covariance matrix and a target covariance matrix. The input covariance matrix represents the pre-processed transport audio signals 403 and the target covariance matrix represents the time-frequency spatial audio signals 407.

The input covariance matrix can be determined from the pre-processed transport audio signals 403 by $$C_x(k, n) = \sum_{b=b_{low}(k)}^{b_{high}(k)} x(b, n)x^H(b, n)$$

As mentioned above, in this example the temporal resolution of the covariance matrix is the same as the temporal resolution of the audio signals. In other examples the temporal resolutions could be different, for example, in examples where filter banks with high temporal selectivity are used.

The covariance matrix $C_x$(k,n) can also be formulated by $$C_x(k, n) = \frac{1}{4}\begin{bmatrix} 1 & 1 \\ 1 & -1 \end{bmatrix} A'(k, n)C_s(k, n)A'^H(k, n)\begin{bmatrix} 1 & 1 \\ 1 & -1 \end{bmatrix}$$

The target covariance matrix can be determined based on the second spatial metadata 315 and the overall signal energy.

The overall signal energy E(k,n) can be obtained as the mean of the diagonal values of $C_x$(k,n), or can be determined based on the omnidirectional component of signal A'(k,n)s (b,n). Then, in some examples, the second spatial metadata 315 comprises a direction θ(k,n), ϕ(k,n) and a direct-to-total ratio parameter r(k,n). If it is assumed that the output is a binaural signal, then the target covariance matrix is $$C_y(k, n) = E(k, n)r(k, n)h(k, \theta(k, n), \phi(k, n))h^H(k, \theta(k, n), \phi(k, n)) + E(k, n)(1 - r(k, n))C_d(k)$$

where h(k, θ(k, n), ϕ(k, n)) is a head-related transfer function column vector for band k and direction θ(k, n), ϕ(k, n).

h(k, θ(k,n), ϕ(k,n)) is a column vector. The vector comprises two values. The values can be complex values. The values correspond to the Head Related Transfer Function (HRTF) amplitude and phase for a left ear and a right ear. At high frequencies, the HRTF values may comprise real values because phase differences are not needed for perceptual reasons at high frequencies.

Any suitable processes can used to obtain the HRTFs. The HRTFs can be obtained for given directions and frequency.

In the above equation CA(k) is the diffuse field binaural covariance matrix. The diffuse field binaural covariance matrix can be determined in an offline stage. The diffuse field binaural covariance matrix can be determined using any suitable process such as obtaining a spatially uniform set of HRTFs, formulating the covariance matrices for them independently, and averaging the result.

The covariance matrix determiner 411 provides covariance matrices 413 as an output. The covariance matrices 413 that are provided as the output can comprise the input covariance matrix $C_x(k,n)$ and the target covariance matrix $C_y(k,n)$.

In the above equations it is implied that the processing is performed in a unified manner within the bins of each band k. In some examples the processing can be performed with a higher frequency resolution, such as for each frequency bin b. In such examples the equations given above would be adapted so that the covariance matrices are determined for each bin b, but using the parameters of the second spatial metadata 315 for the band k where the bin resides.

In some examples the input covariance matrices and the target covariance matrices can be temporally averaged. The temporal averaging could be implemented using infinite impulse repose (IIR), finite impulse response (FIR) averaging or any other suitable type of temporal averaging. The covariance matrix determiner 411 can be configured to perform the temporal averaging so that the temporally averaged covariance matrices 413 are provided as an output.

In this example for obtaining the target covariance matrix only parameters relating to direction and energy ratios have been considered. In other examples other parameters can be taken into consideration when obtaining the target covariance matrix. For example, in addition to the direction and energy ratios spatial coherence parameters, or any other suitable parameters could be considered. The use of other types of parameters can enable spatial audio outputs to be provided in formats other than binaural formats and/or can improve the accuracy with which the spatial sounds can be reproduced.

The processing matrix determiner 415 is configured to receive the covariance matrices 413 $C_x(k, n)$ and $C_y(k, n)$ as an input. The processing matrix determiner 415 is configured to use the covariance matrices 413 $C_x(k,n)$ and $C_y(k,n)$ to determine processing matrices M(k,n) and $M_r(k, n)$. Any suitable process can be used to determine the processing matrices M(k, n) and $M_r(k, n)$. In some examples the process that is used can comprise determining mixing matrices for processing audio signals with a measured covariance matrix $C_x(k, n)$, so that they attain a determined target covariance matrix $C_y(k, n)$. Such methods can be used to generate binaural audio signals or surround loudspeaker signals or other types of audio signals. To formulate the processing matrices the method can comprise using a matrix such as a prototype matrix. The prototype matrix is a matrix that indicates, for the optimization procedure, which kind of signals are meant for each of the outputs. This can be within the constraint that the output must attain the target covariance matrix. In examples where the second audio format is a binaural format, the prototype matrix could be:

$$\begin{bmatrix} 1 & 0.01 \\ 0.01 & 1 \end{bmatrix}$$

This protype matrix indicates that the signal for the left ear is predominantly rendered from the left pre-processed transport channel and the signal for the right ear is predominantly rendered from the right pre-processed transport channel. In some examples the orientation of the user's head can be tracked. If it is determined that the user is now facing towards the rear half-sphere then the prototype matrix would be:

$$\begin{bmatrix} 0.01 & 1 \\ 1 & 0.01 \end{bmatrix}.$$

The processing matrix determiner 415 may be configured to determine the processing matrices M(k,n) and $M_r(k,n)$, based on the prototype matrix and the input and target covariance matrices, using means described in Vilkamo, J., Bäckström, T., & Kuntz, A. (2013). *Optimized covariance domain framework for time-frequency processing of spatial audio. Journal of the Audio Engineering Society,* 61(6), 403-411. The processing matrix determiner 415 is configured to provide the processing matrices M(k,n) and $M_r(k,n)$ 417 as an output.

The processing matrices M(k,n) and $M_r(k,n)$ 417 are provided as an input to a decorrelate and mix block 405. The decorrelate and mix block 405 also receives the pre-processed transport audio signals x(b,n) 403 as an input. The decorrelate and mix block 405 can comprise any means that can be configured to decorrelate and mix the pre-processed transport audio signals x(b,n) 403 based on the processing matrices M(k,n) and $M_r(k,n)$ 417.

Any suitable process can be used to decorrelate and mix the pre-processed transport audio signals x(b,n) 403. In some examples the decorrelating and mixing of the pre-processed transport audio signals x(b, n) 403 can comprise processing the pre-processed transport audio signals x(b,n) 403 with the same prototype matrix that has been applied by the processing matrix determiner 415 and decorrelating the result to generate decorrelated signals $x_D(b, t)$. The decorrelated signals $x_D(b, t)$ (and the pre-processed transport audio signals x(b, n) 403) can then be mixed using any suitable mixing procedure to generate time-frequency audio signals 407.

In some examples the following mixing procedure can be used to generate the time-frequency audio signals 407:

$$y(b, t) = M(k, n)x(b, n) + M_r(k, n)x_D(b, n)$$

where the band k is the one where bin b resides.

As mentioned previously the notation that has been used here implies that the temporal resolution of processing matrices M(k, n) and $M_r(k, n)$ 417 and pre-processed transport audio signals x(b,n) 403 are the same. In other examples they could have different temporal resolutions. For example, the temporal resolution of the processing matrices 417 could be sparser than the temporal resolution of the pre-processed transport audio signals 403. In such examples an interpolation process, such as linear interpolation, could be applied to the processing matrices 417 so as to achieve the same temporal resolution of the pre-processed transport audio signals 403. The interpolation rate can be dependent on any suitable factor. For example, the interpolation rate can be dependent on whether or not an onset has been detected. Fast interpolation can be used if an onset has been detected and normal interpolation can be used if an onset has not been detected.

The decorrelate and mix block 405 provides the time-frequency spatial audio signals 407 as an output.

The time-frequency spatial audio signals 407 are provided as an input to an inverse filter bank 409. The inverse filter bank 409 is configured to apply an inverse transform to the time-frequency spatial audio signals 407. The inverse transform that is applied to the time-frequency spatial audio signals 407 can be a corresponding transform to the one that is used to convert the decoded transport audio signals 323 to time-frequency transport audio signals 327 in FIG. 3.

The inverse filter bank 409 is configured to provide spatial audio output 111 as an output. The spatial audio output 111 is provided in the second audio format.

Different examples could use different methods instead of the covariance matrix based rendering other than the example used in FIG. 4. For instance, in other examples the audio signals could be divided into directional and non-directional parts. A ratio parameter from the spatial metadata could be used to divide the signals into directional and non-directional parts. The directional part could then be positioned to virtual loudspeakers using amplitude panning or any other suitable means. The non-directional part could be distributed to all loudspeakers and decorrelated. The processed directional and non-directional parts could then be added together. Each of the virtual loudspeakers can then be processed with HRTFs to obtain the binaural output. In such examples the spatial synthesizer 317 would comprise a synthesis input generator that would be configured to generate a stereo signal from the time-frequency transport audio signals 327. The stereo signal would be used to generate the virtual loudspeaker signals, so that the left-hand side virtual loudspeaker signals would be synthesized based on the left channel, and the right-hand side virtual loudspeaker signals would be synthesized based on the right channel.

Figure 5:
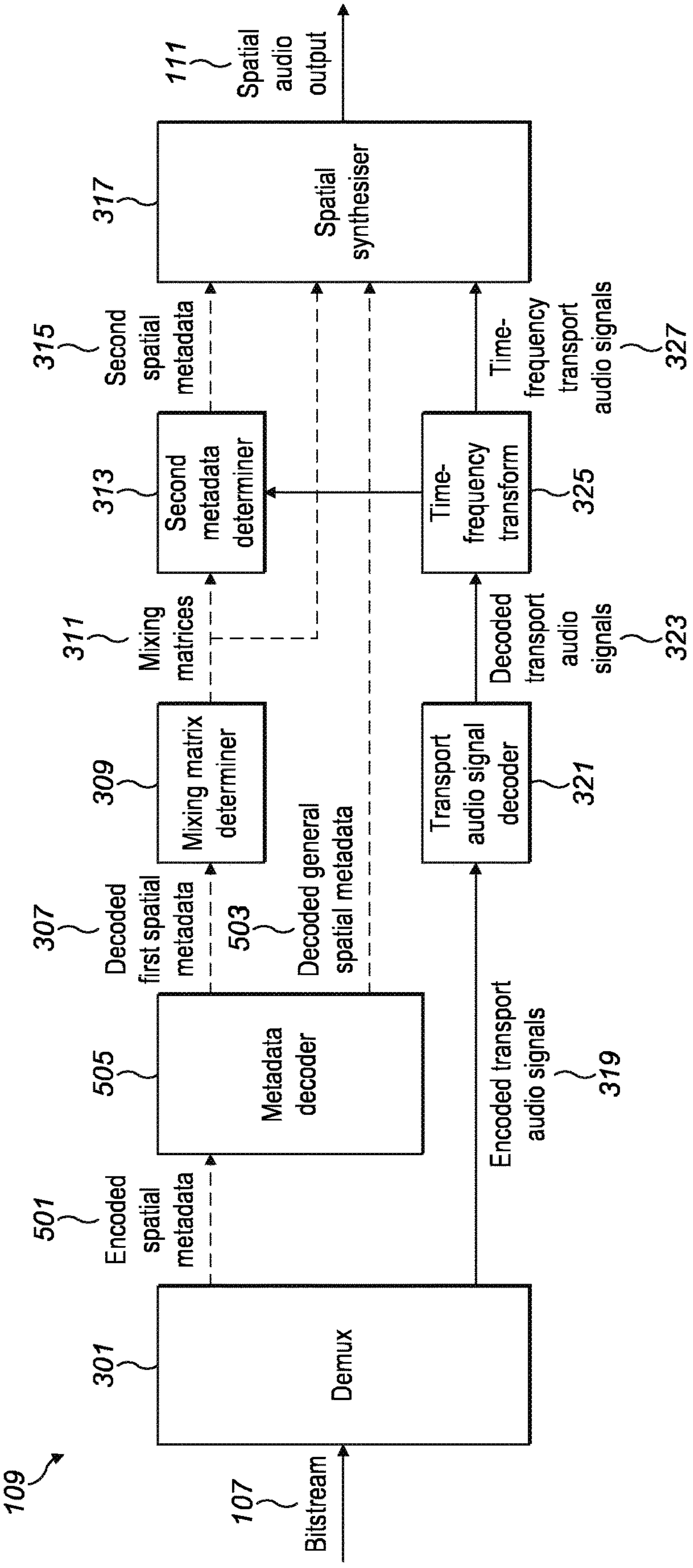

FIG. 5 schematically shows another example decoder 109. The example decoder 109 can also be provided within a system 101 such as the system of FIG. 1. The example decoder 109 can be configured to implement methods such as the methods of FIG. 2 so as to enable spatial audio to be rendered in a different format to the format in which it was obtained.

In the example of FIG. 5 the spatial metadata that is provided within the bitstream 107 comprises different types of metadata. The different types of metadata can be for use at different frequencies. For instance, audio format specific metadata could be used at lower frequencies. The audio format specific metadata could be the first spatial metadata. General metadata could be used for the higher frequencies.

The decoder 109 receives the bitstream 107 as an input. The bitstream 107 can comprise spatial metadata and corresponding audio signals. The spatial metadata can comprise first spatial metadata that is specific to an audio format and general spatial metadata that is not specific to a format.

The bitstream 107 is provided to a demultiplexer 301. The demultiplexer 301 is configured to demultiplex the bitstream 107 into a plurality of streams. In this example of FIG. 3 the demultiplexer 301 demultiplexes the bitstream 107 into a first stream comprising the encoded spatial metadata and a second stream comprising the encoded transport audio signals.

The encoded transport audio signals 319 are provided to a transport audio signal decoder 321. The transport audio signal decoder 321 is configured to decode the encoded transport audio signals 319 to provide decoded transport audio signals 323 as an output. The decoded transport audio signals 323 are provided to a time-frequency transform block 325. The time-frequency transform block 325 provides time-frequency transport audio signals 327 as an output.

The transport audio signal decoder 321 and the time-frequency transform block 325 can be as shown in FIG. 3.

The encoded spatial metadata 501 is provided as an input to a metadata decoder 505. The encoded spatial metadata 501 comprises both the first spatial metadata and general spatial metadata. The metadata decoder 505 is configured to decode the encoded spatial metadata 501 to provide decoded spatial metadata as an output. In this example the metadata decoder 505 provides two streams of spatial metadata as an output. The first stream comprises decoded first spatial metadata 307 and the second stream comprises decoded general spatial metadata 503. The first spatial metadata 307 can be for use at lower frequencies and the general spatial metadata 503 can be for use at higher frequencies.

In this example the general spatial metadata 503 is provided in a format so that it can be provided as an input directly to the spatial synthesizer 317. The general spatial metadata 503 could comprise direction parameters, energy ratio parameters, diffuseness parameters and/or any other suitable parameters.

The decoded first spatial metadata 307 is provided as an input to a mixing matrix determiner block 309. The mixing matrix determiner block 309 can be configured to determine one or more mixing matrices and/or any other suitable rendering information. The mixing matrix determiner block 309 provides mixing matrices 311 as an output. The mixing matrix determiner block 309 can be as shown in FIG. 3.

The mixing matrices A(i,j,k,n) 311 are provided as an input to a second metadata determiner 313. The second metadata determiner 311 also receives the time-frequency transport audio signals 327 as an input. The second metadata determiner 313 is configured to determine the second spatial metadata that enables rendering of the audio signals in the second audio format. The second metadata determiner 313 can be as shown in FIG. 3.

The second spatial metadata 315, the decoded general spatial metadata 503 and the time-frequency transport audio signals 327 and the mixing matrices 311 are provided as inputs to the spatial synthesizer 317. The spatial synthesizer 317 is configured to use the second spatial metadata 315, the decoded general spatial metadata 503, the time-frequency transport audio signals 327 and the mixing matrices 311 to render the spatial audio output 111. The spatial audio output can be a binaural output or any other suitable audio format.

In the above described examples the second spatial metadata is determined from rendering information such as mixing matrices. In other examples the second spatial metadata can be determined directly from the first spatial metadata. For instance, in the example of FIG. 3 the second spatial metadata could be determined from the decoded first spatial metadata without determining the intermediate mixing matrices.

In these examples the parameters within the spatial metadata have been limited to directions and energy ratios for simplicity. Other parameters could be comprised within the spatial metadata in other implementations. For instance, in some examples the spatial metadata could comprise a surrounding coherence parameter $\gamma(k, n)$ or any other suitable parameter.

A surrounding coherence parameter can be determined based on diagonal values of a covariance matrix for FOA audio signals $C_{FOA}(k, n)$. If the omnidirectional energy is large with respect to the first-order energies, then the sound may be considered to have surrounding coherence.

In the above examples the spatial audio output 111 is a binaural output. Other types of spatial audio output could be used in other examples and the processes and components could be adapted as appropriate. For instance, if the spatial audio output is a HOA output a combined approach could be used. In the combined approach the zeroth and the first orders can be rendered using the Mixing matrices A(i,j,k,n) 311 as described above. The higher orders can be rendered by using second spatial metadata 315 to render them. A spatial synthesizer 317 could be configured to use the second spatial metadata 315 to render the higher orders.

As an example, the directions of the second spatial metadata 315 could be used to determine Ambisonic panning gains for a given order. This can be used to steer the $\sqrt{r(k,n)}$ portion of the omnidirectional component of the Ambisonic signal to the Ambisonic channels of second and higher orders. The $\sqrt{1-r(k,n)}$ portion can be distributed to the second and higher order signals with a gain according to the applied Ambisonic normalization scheme. Decorrelation can be used to distribute the $\sqrt{1-r(k,n)}$ portion to the second and higher order signals.

Figure 6:
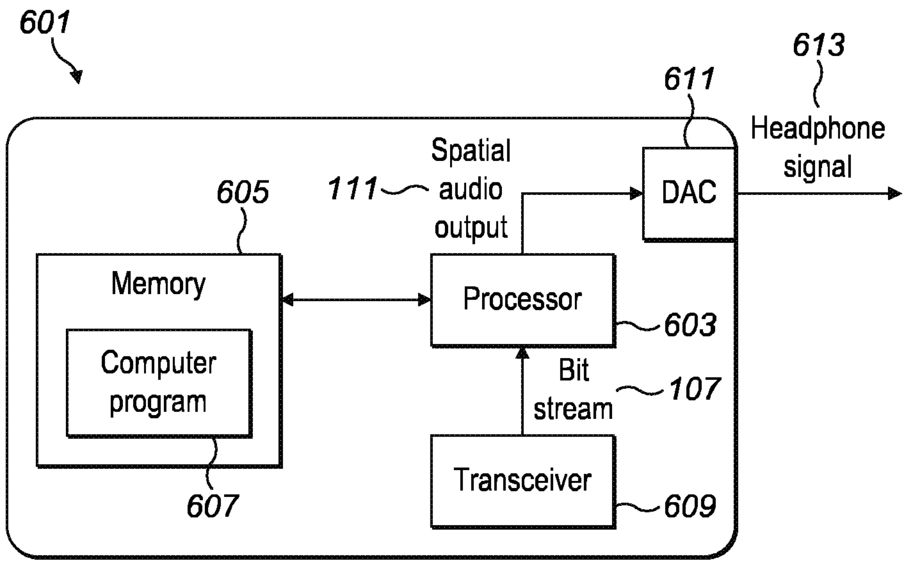

FIG. 6 shows an example device 601 that could be used to implement examples of the disclosure. The device 601 could be an electronic device such as a telephone, a camera, a computing device, a teleconferencing apparatus or any other suitable type of device.

The device 601 as shown in FIG. 6 comprises a processor 603, a memory 605, a transceiver 609 and a digital to analog converter (DAC) 611. The device 601 could also comprise additional components that are not shown in FIG. 6. For example, the device 601 could comprise a display, user interfaces, microphones, loudspeakers, connection means for connecting to peripheral devices such as headphones and any other suitable components.

The transceiver 609 can be configured to receive signals from remote devices. The transceiver 609 can be configured to receive signals via any suitable communication networks. In the examples of FIG. 6 the transceiver 609 is configured to receive a bit stream 107. The bit stream 103 can comprise transport audio signals and corresponding spatial metadata.

The bit stream 103 is provided to the processor 603. The processor 603 can be configured to provide the function of the decoder 109 as shown in the system of FIG. 1. The function of the encoder 105 would be performed by the remote apparatus from which the bitstream originates.

The processor 603 can be configured to access one or more computer programs 607 that are stored in the memory 605 of the device 601. The one or more computer programs 607 can be configured to enable the processor to implement the methods and processes described herein.

The processor provides spatial audio output 111 as an output. This output can comprise a Pulse Code Modulated (PCM) signal, or any other suitable type of signal. The spatial audio output 111 is provided to the DAC 111. The DAC 111 is configured to convert the digital signal to an analog signal suitable for playback. In this example the spatial audio output 111 comprises a binaural signal and the device used for playback could comprise headphones or and headset. Other types of devices could be used for playback in other examples. The playback device enables a user to hear the sounds.

Figure 7:
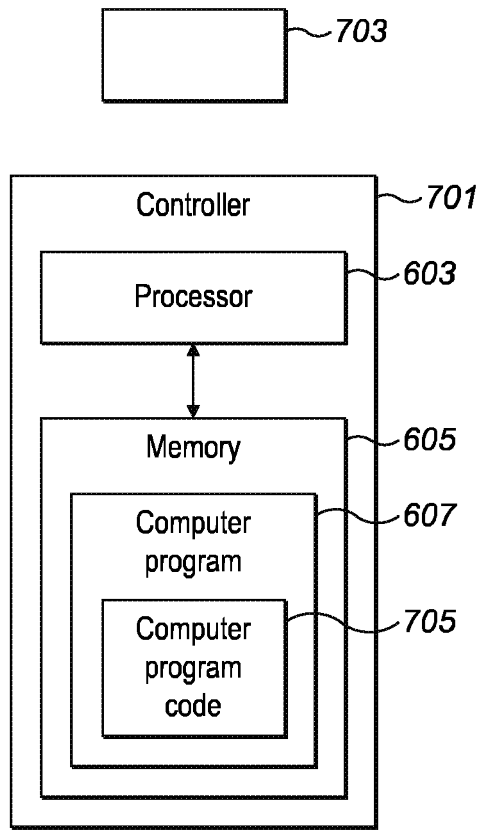

FIG. 7 schematically shows an example apparatus 701 that could be used in some examples of the disclosure. The apparatus 701 could comprise a controller apparatus and could be provided within an electronic device 601 as shown in FIG. 6. In the example of FIG. 7 the apparatus 701 comprises at least one processor 603 and at least one memory 605. It is to be appreciated that the apparatus 701 could comprise additional components that are not shown in FIG. 7.

In the example of FIG. 7 the implementation of the apparatus 701 can be implemented as processing circuitry. In some examples the apparatus 701 can be implemented in hardware alone, have certain aspects in software including firmware alone or can be a combination of hardware and software (including firmware).

As illustrated in FIG. 7 the apparatus 701 can be implemented using instructions that enable hardware functionality, for example, by using executable instructions of a computer program 607 in a general-purpose or special-purpose processor 603 that can be stored on a computer readable storage medium (disk, memory etc.) to be executed by such a processor 603.

The processor 603 is configured to read from and write to the memory 605. The processor 603 can also comprise an output interface via which data and/or commands are output by the processor 603 and an input interface via which data and/or commands are input to the processor 603.

The memory 605 is configured to store a computer program 607 comprising computer program instructions (computer program code 705) that controls the operation of the apparatus 701 when loaded into the processor 603. The computer program instructions, of the computer program 607, provide the logic and routines that enables the apparatus 701 to perform the methods illustrated in FIGS. 2 to 5. The processor 603 by reading the memory 605 is able to load and execute the computer program 607.

The apparatus 701 therefore comprises: at least one processor 603; and at least one memory 605 including computer program code 705, the at least one memory 605 and the computer program code 705 configured to, with the at least one processor 603, cause the apparatus 701 at least to perform:

- obtaining an encoded spatial audio signal comprising one or more audio signals and first spatial metadata wherein the first spatial metadata is configured to enable rendering of spatial audio in a first audio format from the one or more audio signals;
- using, at least the first spatial metadata to determine second spatial metadata wherein the second spatial metadata enables rendering of spatial audio in a second audio format from the one or more audio signals; and
- enabling rendering of the spatial audio in the second audio format using at least the second spatial metadata and the one or more audio signals.

As illustrated in FIG. 1 the computer program 607 can arrive at the apparatus 701 via any suitable delivery mechanism 703. The delivery mechanism 703 can be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid-state memory, an article of manufacture that comprises or tangibly embodies the computer program 607. The delivery mechanism can be a signal configured to reliably transfer the computer program 607. The apparatus 701 can propagate or transmit the computer program 607 as a computer data signal. In some examples the computer program 607 can be transmitted to the apparatus 701 using a wireless protocol such as Bluetooth, Bluetooth Low Energy, Bluetooth Smart, 6LoWPan ($IP_v6$ over low power personal area networks) ZigBee, ANT+, near field communication (NFC), Radio frequency identification, wireless local area network (wireless LAN) or any other suitable protocol.

The computer program 607 comprises computer program instructions for causing an apparatus 607 to perform at least the following:

obtaining an encoded spatial audio signal comprising one or more audio signals and first spatial metadata wherein the first spatial metadata is configured to enable rendering of spatial audio in a first audio format from the one or more audio signals;

using, at least the first spatial metadata to determine second spatial metadata wherein the second spatial metadata enables rendering of spatial audio in a second audio format from the one or more audio signals; and enabling rendering of the spatial audio in the second audio format using at least the second spatial metadata and the one or more audio signals.

The computer program instructions can be comprised in a computer program 607, a non-transitory computer readable medium, a computer program product, a machine readable medium. In some but not necessarily all examples, the computer program instructions can be distributed over more than one computer program 607.

Although the memory 605 is illustrated as a single component/circuitry it can be implemented as one or more separate components/circuitry some or all of which can be integrated/removable and/or can provide permanent/semi-permanent/dynamic/cached storage.

Although the processor 603 is illustrated as a single component/circuitry it can be implemented as one or more separate components/circuitry some or all of which can be integrated/removable. The processor 603 can be a single core or multi-core processor.

References to "computer-readable storage medium", "computer program product", "tangibly embodied computer program" etc. or a "controller", "computer", "processor" etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term "circuitry" can refer to one or more or all of the following:

(a) hardware-only circuitry implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions and (c) hardware circuit(s) and or processor(s), such as a microprocessor(s) or a portion of a microprocessor(s), that requires software (e.g. firmware) for operation, but the software might not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The blocks illustrated in the FIGS. 2 to 5 can represent steps in a method and/or sections of code in the computer program 607. The illustration of a particular order to the blocks does not necessarily imply that there is a required or preferred order for the blocks and the order and arrangement of the block can be varied. Furthermore, it can be possible for some blocks to be omitted.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. An apparatus for communication audio, comprising:

at least one processor; and at least one memory storing instructions that, when executed with the at least one processor, cause the apparatus at least to:

obtain an encoded spatial audio signal comprising one or more audio signals and first spatial metadata, wherein the first spatial metadata is configured to enable rendering of spatial audio in a first audio format based on the one or more audio signals;

determine second spatial metadata using at least the first spatial metadata, wherein the second spatial metadata enables rendering of spatial audio in a second audio format based on the one or more audio signals; and enable rendering of the spatial audio in the second audio format using at least the second spatial metadata and the one or more audio signals.

2. An apparatus as claimed in claim 1, wherein the instructions, when executed with the at least one processor, cause the apparatus to determine the second spatial metadata using the first spatial metadata to determine: rendering information from the first spatial metadata, and the second spatial metadata from the rendering information.

3. An apparatus as claimed in claim 2, wherein the rendering information comprises one or more mixing matrices.

4. An apparatus as claimed in claim 1, wherein the instructions, when executed with the at least one processor, cause the apparatus to determine the second spatial metadata using the first spatial metadata to at least one of:

determine the second spatial metadata directly from the first spatial metadata; or determine the second spatial metadata based on the one or more audio signals.

5. An apparatus as claimed in claim 1, wherein the instructions, when executed with the at least one processor, cause the apparatus to determine the second spatial metadata using the first spatial metadata to determine one or more covariance matrices of the one or more audio signals.

6. An apparatus as claimed in claim 1, wherein the instructions, when executed with the at least one processor, cause the apparatus to determine the second spatial metadata without rendering the spatial audio in the first audio format.

7. An apparatus as claimed in claim 1, wherein the instructions, when executed with the at least one processor, cause the apparatus to enable different types of spatial metadata to be used for rendering different frequencies of the spatial audio.

8. An apparatus as claimed in claim 7, wherein generic spatial metadata is used for rendering a first set of frequencies of the spatial audio and a format specific further spatial metadata is used for a second set of frequencies.

9. An apparatus as claimed in claim 1, wherein the first audio format and the second audio format comprise one or more of: ambisonic formats; binaural formats; or multichannel loudspeaker formats.

10. An apparatus as claimed in claim 1, wherein at least one of the first spatial metadata or the second spatial metadata comprises information that enables mixing of the one or more audio signals so as to enable rendering of spatial audio in a selected audio format.

11. An apparatus as claimed in claim 1, wherein at least one of the first spatial metadata or the second spatial metadata comprises, for one or more frequency sub-bands, at least one of:

information indicative of at least one of:

a sound direction; or sound directionality; or one or more prediction coefficients.

12. An apparatus as claimed in claim 1, wherein at least one of the first spatial metadata or the second spatial metadata comprises one or more coherence parameters.

13. A method for communication audio comprising:

obtaining an encoded spatial audio signal comprising one or more audio signals and first spatial metadata wherein the first spatial metadata is configured to enable rendering of spatial audio in a first audio format based on the one or more audio signals;

determining second spatial metadata using at least the first spatial metadata, wherein the second spatial metadata enables rendering of spatial audio in a second audio format based on the one or more audio signals; and enabling rendering of the spatial audio in the second audio format using at least the second spatial metadata and the one or more audio signals.

14. A method as claimed in claim 13, wherein using the first spatial metadata to determine the second spatial metadata comprises determining: rendering information from the first spatial metadata, and the second spatial metadata from the rendering information.

15. A method as claimed in claim 14, wherein the rendering information comprises one or more mixing matrices.

16. A method as claimed in claim 13, wherein using the first spatial metadata to determine the second spatial metadata comprises at least one of:

determining the second spatial metadata directly from the first spatial metadata;

determining the second spatial metadata based on the one or more audio signals;

determining one or more covariance matrices of the one or more audio signals; or determining the second spatial metadata without rendering the spatial audio in the first audio format.

17. A method as claimed in claim 5, wherein at least one of the first spatial metadata or the second spatial metadata comprises at least one of:

information that enables mixing of the one or more audio signals so as to enable rendering of the spatial audio in a selected audio format;

for one or more frequency sub-bands, information indicative of at least one of:

a sound direction; or sound directionality;

for one or more frequency sub-bands, one or more prediction coefficients; or one or more coherence parameters.

18. A method as claimed in claim 13, further comprising enabling different types of spatial metadata to be used for rendering different frequencies of the spatial audio.

19. A method as claimed in claim 18, wherein generic spatial metadata is used for rendering a first set of frequencies of the spatial audio and a format specific further spatial metadata is used for a second set of frequencies.

20. A non-transitory computer readable medium for communication audio comprising instructions stored thereon for performing at least the following:

obtaining an encoded spatial audio signal comprising one or more audio signals and first spatial metadata wherein the first spatial metadata is configured to enable rendering of spatial audio in a first audio format based on the one or more audio signals;

using, at least the first spatial determine second spatial metadata wherein the second spatial metadata enables rendering of spatial audio in a second audio format based on the one or more audio signals; and enabling rendering of the spatial audio in the second audio format using at least the second spatial metadata and the one or more audio signals.

* * * * *